REMOTE INTELLIGENCE SAMPLING MEANS

Filed April 2, 1959 3 Sheets-Sheet 1

INVENTORS
HENRY M. DIAMBRA
HEINZ E. BLUM
BY Max L. Libman
ATTORNEY

INVENTORS
HENRY M. DIAMBRA
HEINZ E. BLUM
BY Max L. Libman
ATTORNEY

REMOTE INTELLIGENCE SAMPLING MEANS

Filed April 2, 1959 3 Sheets-Sheet 3

INVENTORS
HENRY M. DIAMBRA
HEINZ E. BLUM
BY Max L. Libman
ATTORNEY

United States Patent Office 3,048,780

Patented Aug. 7, 1962

3,048,780

REMOTE INTELLIGENCE SAMPLING MEANS

Henry M. Diambra, Silver Spring, and Heinz E. Blum, Hyattsville, Md., assignors to Entron, Inc., Bladensburg, Md., a corporation of Delaware Filed Apr. 2, 1959, Ser. No. 803,771
11 Claims. (Cl. 325—31)

This invention relates to a system and apparatus for remote sampling of the operation of a radio frequency closed circuit system having a number of receiving units provided with radio frequency information via a closed circuit (e.g., coaxial cable), and having means responsive to interrogating signals selectively transmitted to successive ones of said receiving units for providing information concerning the operation of the individual units.

An example of a system of the above type is provided by the problem existing in connection with closed circuit pay television, where it is desired to accumulate information at a central point concerning the amount of use of each television set, so that each user may be billed in accordance with the amount of use of his set. However, the invention is not restricted to this particular application, but is useful in any application where radio frequency intelligence is supplied via a closed circuit, such as a coaxial cable, to a large number of radio frequency utilization devices, and it is desired from time to time to obtain information concerning the operation of these devices for any purpose whatever, such as above-described, or also for the purpose of controlling the receiving devices from the remote location in accordance with the information transmitted by such devices.

It is a primary object of the invention to provide a relatively simple, efficient and reliable system for the above purpose, yet capable of receiving a large amount of information from a very large number of radio frequency utilization devices, with the use of a minimum amount of equipment, and at minimum expense.

Another object is to provide in a system of the above described type, means for interrogating the individual radio frequency utilization devices selectively by means of a radio or audio frequency signal transmitted over the same closed circuit which supplies the primary radio frequency information together with means associated with each individual receiving unit for returning an audio frequency signal to a central information receiving point, said audio signal being indicative of an operating condition of the individual utilization device.

Still another object is the provision of a simple means for connecting each individual utilization device to the R.F. transmission line via an R.F. attenuating device which also permits the transmission of audio frequency without attenuation, such connecting device being simple, inexpensive, unitary, rugged in construction, and capable of attachment to a coaxial cable with a minimum of tools and no disruption to operation of the coaxial cable line while the connection is being made.

The specific nature of the invention, as well as other objects and advantages thereof, will clearly appear from a description of a preferred embodiment as shown in the accompanying drawings, in which.

Figures 1, 2:
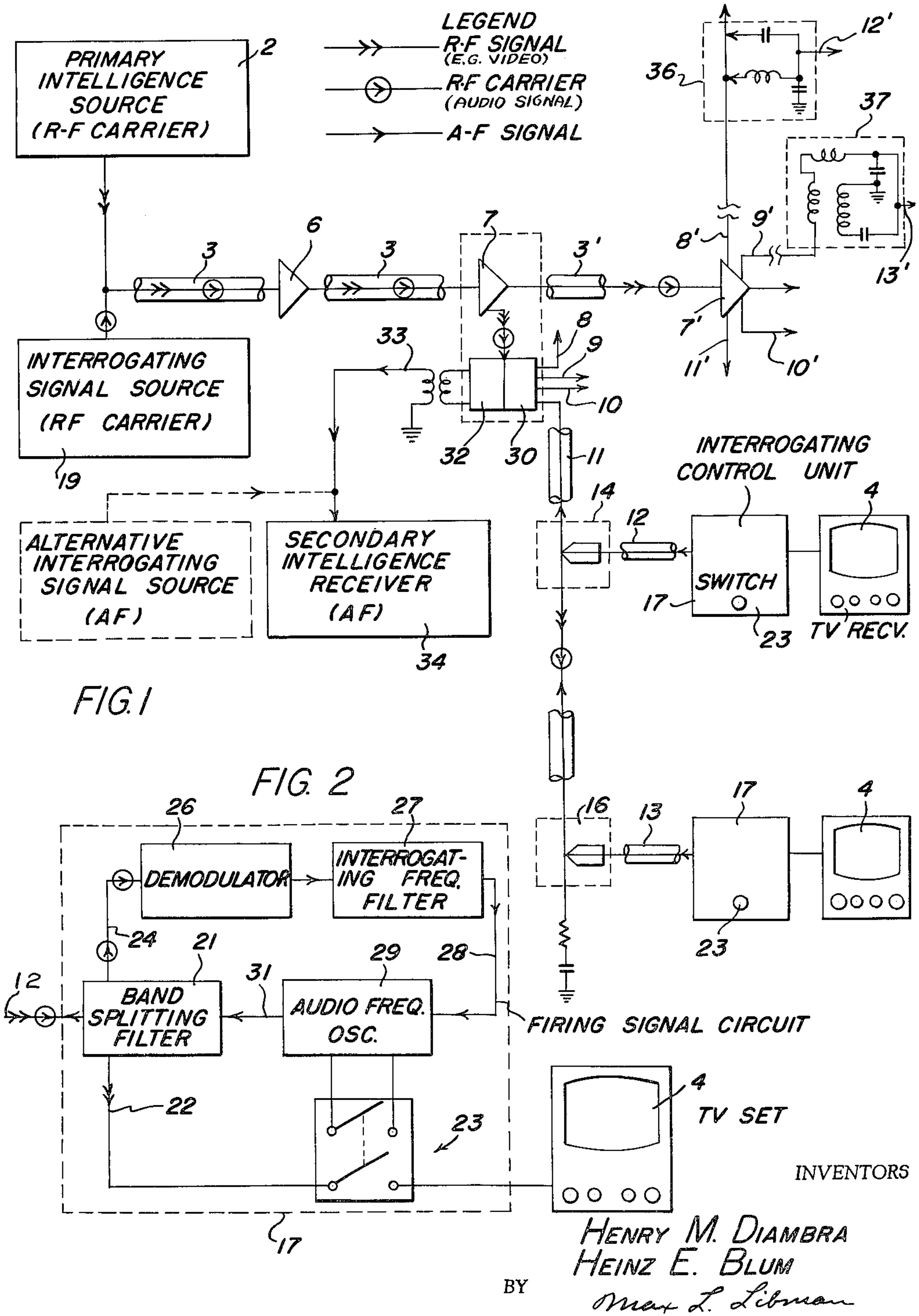
FIG. 1 is a schematic circuit diagram of a system according to the invention.
FIG. 2 is a schematic diagram of the interrogation control unit shown in FIG. 1, on an enlarged scale.

FIG. 1 shows a system utilizing the principles of the present invention. The problem in this case is to supply information from a primary intelligence signal source 2, which may be a television camera in a studio, or may be a local TV signal transmitting link in a network, via a closed circuit represented by coaxial cable 3 to a large number of individual television sets 4 in the homes of the users. In this case, the picture signal is transmitted through a main coaxial cable trunk 3, through a series of amplifiers, neecssary because of the attenuation of the signal in the coaxial cable or waveguide or other closed-circuit transmission link employed. A number of repeater amplifiers 6 will generally be employed, spaced at suitable distances along the trunk line 3. For distribution to individual homes, a bridging amplifier 7 is used, which transmits a signal to an extension of trunk line 3 as shown at 3′, and also is provided with a plurality of radio frequency cable outlets 8, 9, 10, and 11. Each of these, for example, distribution cable 11, is capable of supplying a large number, for example, 30 or 40, of individual television sets through smaller feeder coaxial cable lines such as 12 and 13, which are connected to the distribution line 11 by means of connection devices such as 14 and 16. It is also necessary to provide, at connection points 14, 16, etc., some means for attenuating the signal passed to the respective feeder lines 12 and 13, in varying degrees, depending chiefly upon the distance of the connection point from the amplifier 7. It will be apparent that line 12 will tend to draw a greater portion of the signal, and leave correspondingly less available for line 13, unless a greater attenuation is inserted at the point of connection at line 12 than at point of connection of line 13. This problem is well known, for example, in the community antenna system art, and it is customary to use resistive or capacitive attenuators at the points where the feeder line taps into the distribution line, in order to equalize the signal on all of the feeder lines. However, in that case, the problem relates only to attenuation of radio frequency signals, and no audio frequency signals are involved.

Associated with each individual television set 4 is an interrogation control unit 17 having a switch 23, which must be turned on to transmit a signal from feeder line 12 to the television set 4, as will be explained below in more detail.

At the central point of the system, usually located at the same point as the primary intelligence signal source 2, there is an interrogating signal source 19 which can be operated to periodically transmit an interrogating signal to the network on a different R.F. carrier from that used for the primary intelligence signal, so that there is no interference. The actual interrogating signal may be an audio frequency or intermediate frequency signal modulating the R.F. carrier, and sweeping successfully through an entire range of interrogating signals. These interrogating signals in a practical case would generally be digitally coded signals, and each interrogation control unit 17 would be assigned a particular digit, so that when this digit occurred on the line, the interrogating control unit 17 will respond as will be shown below. However, to illustrate the principle of the invention, the simple case will be taken where the interrogation control unit responds only to a single interrogation frequency, and the interrogating signal source 19 sweeps the entire range of interrogating frequencies, one such interrogating frequency being assigned to each TV set.

Referring to FIG. 2, which shows the interrogating control unit 17 in dotted lines, it will be seen that this unit contains a band splitting filter 21 which receives the signals from feeder line 12, and sends the primary intelligence signal from source 2 down line 22 to switch 23, and thence to the TV set 4. The interrogating signal from source 19 is also received along feeder line 12, and being of a different frequency range from the primary intelligence signal, is separated by the band splitting filter 21 and emitted on line 24, passed through the demodulator 26 to produce the interrogating frequency, which is filtered by filter 27 which is tuned to the frequency assigned to this particular television set. All other frequencies will be suppressed, but when a signal of the correct frequency for identifying that particular set is received, it passes through filter 27 and produces a signal on line 28, which is fed to audio frequency oscillator 29. If switch 23 is not closed, the audio frequency oscillator is not actuated, and nothing occurs, but if switch 23 has been closed, indicating that the television set 4 has been turned on, the audio frequency oscillator 29 has also been turned on by operation of switch 23, and is therefore conditioned for operation. In the latter event, the audio frequency signal on line 28 fires the audio frequency oscillator and causes it to emit an audio frequency signal on line 31, which may be at the same frequency as the firing signal on line 28, or may be at any other desired or suitable frequency. This audio signal on line 31 is transmitted back through feeder line 12, back through connection device 14, which will be explained below, through distribution line 11, to filter network 32, where it is separated out of line 11 and transmitted to line 33, which may be an ordinary unshielded telephone line, since this signal is at an audio frequency, or in any case at a very much lower frequency than the primary intelligence signal. This response signal is transmitted to secondary intelligence receiver 34, where it may be used in a variety of ways which are not the subject of the present invention. For example, it may be suitably stored on a recording device and subsequently utilized in making up the customer's bill, depending upon the number of times the television set is turned on for specific programs, the charge being for a specific program. Alternatively, it may be utilized to transmit information back to the receiving device, in the case where the receiving device is not necessarily a television set, but may be some device which is controlled by the primary intelligence signal. It will be apparent that, in the example given above, the interrogating signal source sweeps through a wide range of frequencies, and since the interrogated devices (TV sets) are each assigned to a different single frequency, all of the television sets will be interrogated in turn during the sweeping process. Alternatively, any particular frequency may be emitted from interrogating signal 19, which will then interrogate only the particular television set to which that particular frequency is assigned. In a practical situation, instead of the interrogating frequency filter 27, any known form of signal decoding device may be used, and the interrogating signal may be in coded form and corresponding to a decimal or digital number, so that a signal is emitted on line 28 only when that number is received.

It will be apparent from the preceding, that the connection point 14, 16, etc., must have the characteristic of transmitting to the feeder line the radio frequency attenuated to a desired degree, and must be able also to pass an audio frequency from the feeder line (12, 13, etc.), without appreciable attenuation. This could, of course, be done by the use of a suitable filter circuit, and a number of typical filter circuits for this purpose are shown by way of example in connection with the distribution lines 8′ and 9′, whereby the signal transmitted to the individual feeder lines 12′ and 13′ would be essentially that described above. However, it will be apparent that the provision of such filter circuits as are shown at 36 and 37 are relatively expensive in material, and complicated to connect to the line by conventional means.

Figures 3, 4, 5:
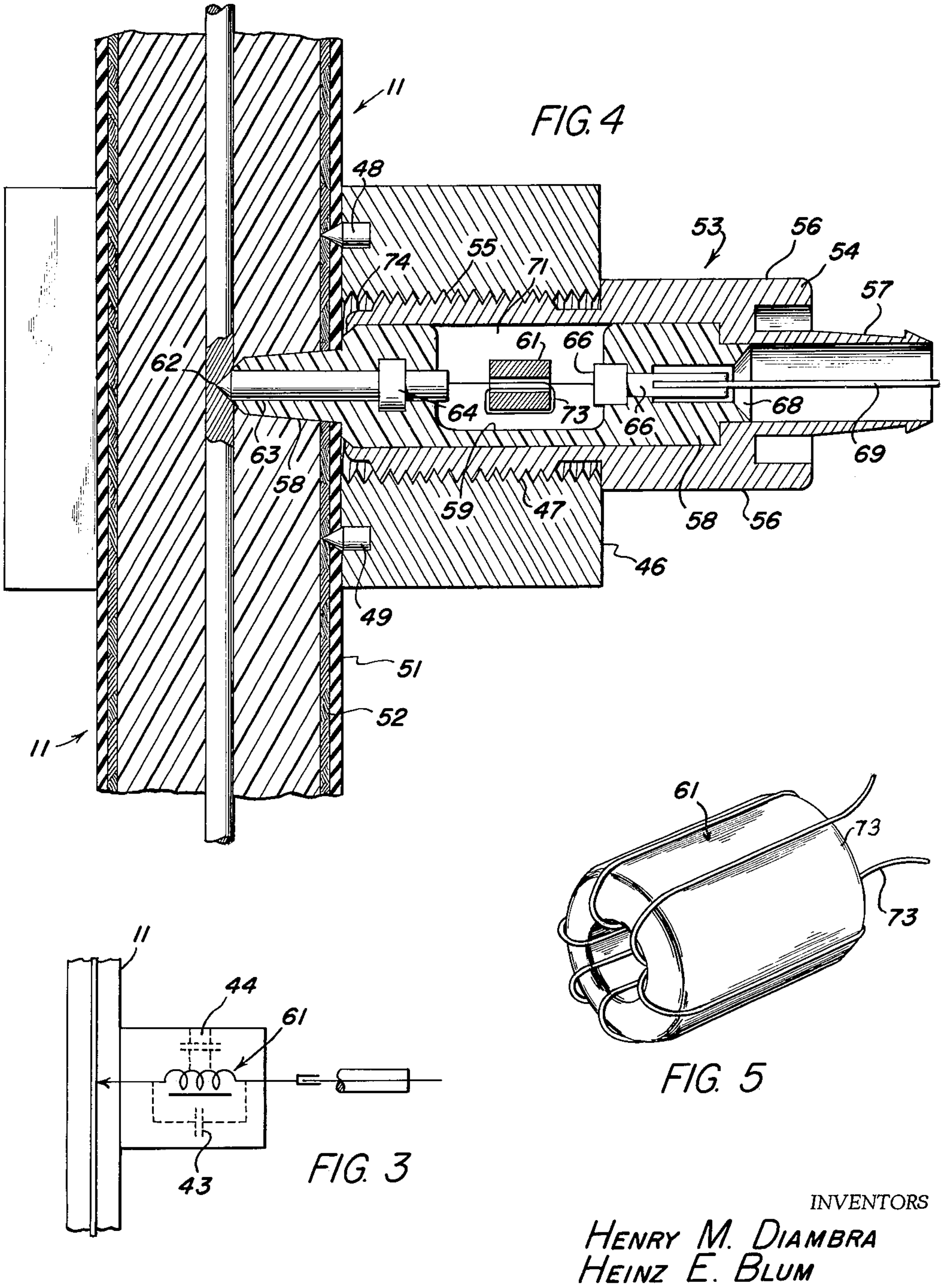
FIG. 3 is a schematic circuit diagram of the attenuating coaxial tap-off used in FIG. 1.
FIG. 4 is a longitudinal sectional view of the same tap-off, showing its mechanical construction.
FIG. 5 is a view showing the construction of the inductive unit used in the tap-off of FIG. 4.

FIG. 3 shows the equivalent electrical circuit of a simple connector, shown in detail in FIG. 4, which provides all of the necessary characteristics, both electrical and mechanical, for making a simple tap-off at any desired point on any of the distribution lines.

In essence, the tap-off unit provides a controllable radio frequency attenuation by means of an inductive reactance, the attenuating value of which for the R.F. signal can be varied by varying the number of turns of wire wound around a very small ferrite toroidal core 61 (FIGS. 4 and 5) having high permeability at radio frequencies. This inductive element 61 (FIG. 3) has an inherent interturn capacity 43 as well as a capacity to ground 44, both of which provide radio frequency paths. It is, of course, desired to keep the shunt capacitance 44 as low as possible.

The physical construction of the tap-off unit is shown in FIG. 4. Externally, the unit bears a general relation to the type of tap-off coupler shown in Patent No. 2,694,183, granted to Edlen and Diambra on November 9, 1954. Both of them are piercing tap-off couplers, that is, with braided cable they can be installed by first clamping a seating block 46 about the cable and then screwing the coupling unit shell 54 into the seating block whereby the point 62 automatically penetrates the conductor and inner insulation and makes contact with the central conductor of the coaxial cable through a piercing pin. However, the construction of the piercing pin 15 is quite different in the present unit, and the construction of the attenuating element is entirely different, as the attenuating element is electrically as shown in FIG. 3, and is therefore suitable for use in the system of FIG. 1, which is not true of the prior art tap-off coupler. Although the unit will be described in connection with braided shielding, it will be understood that this unit can also be used with solid aluminum shielded coaxial conductor, except that in this case it is necessary to predrill a hole through the aluminum shielding prior to insertion of the unit, in a manner well known in the art.

In installing the tap-off coupler, block 46 is first clamped about the cable 11 in any suitable manner, for example as shown in Patent No. 2,694,183, above referred to. The block is provided with a threaded aperture 47, and has two short piercing pins 48 and 49 which pierce through the outer layer 51, usually of vinyl plastic or similar insulating material, and make contact with the outer braid 52 which serves as one conductor of the cable 11. In this manner, the block 46 establishes electrical contact with the outer conductor of the cable. The tap-off coupler 53 is provided with an outer shell 54 having a threaded portion 55 for engaging the threaded aperture 47, a main body portion usually provided with flat surfaces 56 to constitute a nut for applying threading force to the element, and a rearwardly extending tubular portion 57 for engaging the outer coaxial conductor of feeder cable 12 in conventional fashion. Shell 54 is hollow within for reception of a plastic housing 58 which has a hollowed out central portion 59 for reception of the attenuating unit which will be described below. Forwardly, the plastic member 58 protrudes beyond the threaded portion 55 of the shell in a tapering fashion to near the end, where it tapers more bluntly to a point at 62. The actual piercing point is provided by the protruding forward end of a conductor 63 which is embedded in the plastic element, and preferably firmly locked therein as indicated at 64, and which extends rearwardly into the chamber 59. At the rearward end of the insulating member 58, and colinear with conductor 63 is another similar conductor 66 which also protrudes at one end into the chamber and at the other end is suitably formed to engage the central conductor of the coaxial cable 12, by being made as a well known wire-vise type of connector. Preferably also, the rear surface 68 of the plastic unit is inwardly sloped as shown to aid in guiding the central conductor 69 of cable 12 into engagement with the wire-vise end of conductor 66.

Chamber 59 of the insulating unit 58 is preferably left open at one side as generally indicated at 71, to allow insertion of impedance unit 61, which is constructed as best shown in FIG. 5, of a torodial core 72 of ferrite wound with a number of turns of fine wire 73 (e.g., No. 32) to constitute the impedance element. The ends of wire 73 are respectively soldered to the opposed ends of conductors 63 and 66, after which the entire unit 58 and 61 is inserted into the metal shell, and retained there, as for example, by beading over the rim 74 at the end of threaded portion 55, and the unit is now ready for use. It will be understood that the attenuation value is varied by varying the number of turns on the respective units, and that a number of values or ranges of attenuation will be provided, for use at varying distances along the distribution line 11 from the amplifier 7.

Figure 6:
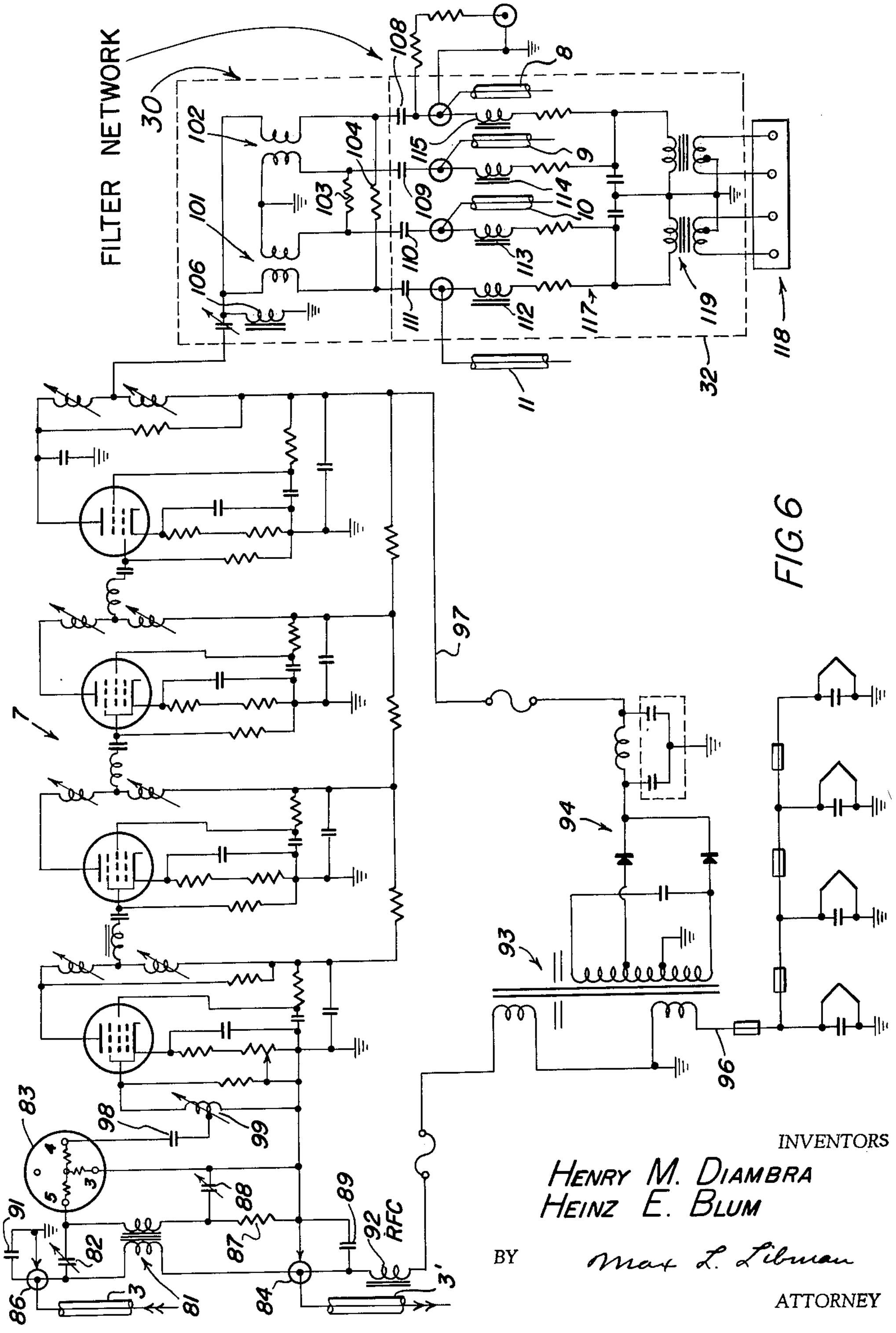
FIG. 6 is a detailed schematic circuit diagram of the bridging amplifier and associated circuitry for supplying a number of branch lines from the trunk line.

FIG. 6 is a schematic circuit diagram showing the elements 3, 7, 30, 32, and 11 in more detail. It will be noted that incoming trunkline section 3 is connected to outgoing trunk section 3' through a low-impedance input transformer 81 designed to provide only about 0.5 db. loss in signal strength between trunk sections 3 and 3'. A ferrite core is used to magnetically couple the windings of the transformer. It is important that the input coupling circuit isolate the amplifier 7 from the trunk and prevent or reduce any discontinuities or failures of the amplifier from being transferred into the main trunk system, and vice versa.

The R.-F. section of the input coupling nework includes capacitor 82 which provides a capacitive path for the R.-F. trunk line to the input of plug-in pad 83; capacitors 91 and 89 are provided for impedance matching purposes. By providing the proper values of the respective components according to known design considerations, the R.-F. input network here shown is made to act as a directional coupler since the phase components of the current coupled through the transformer 81 and capacitor 82 will cancel at the input to the plug-in pad 83 when the transformer 81 is excited from the trunk line output terminal 84. This condition affords maximum isolation between the trunk line output terminal 84 and the input to the R.-F. amplifier.

Isolation between the trunk line input terminal 86 and the pad is provided by accurately dimensioning the coupling between the plates of condenser 82 and between the windings of transformer 81. This condition reduces the effects of discontinuities and failures presented to the input 86. It also affects the R.-F. power reduction from the trunk line input 86 to the output 84, since the coupling determines the power division between the trunk line output and the input to the pad.

The wire size of the transformer primary coil should be sufficiently large to pass the power in the trunk line without appreciable voltage drop, and not to impede the current carrying capacity of the trunk line system. Condenser 88 and resistor 87 are selected to provide the correct impedance match to the input of the plug-in pad and the R.-F. amplifier.

Condensers 89 and 91 are selected to match the impedance of the input network to the impedance of the trunk line.

R.-F. choke 92 provides a means whereby low-frequency power, e.g., at 60 cycles, may also be provided at the R.-F. trunk line to power the amplifier 7; this low-frequency power cannot, of course, pass directly into the R.-F. circuitry of the amplifier because the circuit elements described above present a very high impedance to such low frequencies, but the R.-F. choke readily passes sufficient 60 cycle current to transformer 93 to operate a power pack 94 which supplies filament power on line 96 and D.-C. B+ power on line 97 for the tubes of amplifier 7.

The resistor pad 83 is preferably of the plug-in type to provide a distortion-free means for varying the gain of the unit by substituting pad of different value. Condenser 98 and autotransformer 99 form part of the series-shunt double-tuned input transformer.

The R.-F. amplifier 7 is comprised of four vacuum tubes coupled by double-tuned transformers to one another and to the input and the output, and is not per se a part of the present invention, as any suitable known amplifier circuit could be employed, although the circuit shown is particularly effective for the present purpose.

The input and output transformers of the amplifier are designed to match the amplifier to the characteristic impedance (typically 75 ohms) of the system across the operating frequency band, typically 25–50 megacycles.

The R.-F. output filter network 30 (see also FIG. 1) is incorporated to provide the four R.-F. outputs, e.g., on lines 8, 9, 10, and 11 of FIG. 1, of the required characteristic impedance, typically 75 ohms, with minimum through loss. This network is comprised of two balanced 150 ohm transmission lines 101 and 102 which are made electrically long by using ferrite cores, and are connected to the respective lines 8, 9, 10, and 11 through condensers 108, 109, 110, and 111 respectively. The two transmission lines are paralled on one end and terminated in separate balanced terminating resistors 103 and 104 equal to the characteristic impedance of the transmission line. The paralled end therefore presents a 75 ohm impedance; the two resistors being provided to present the correct impedance (e.g., 75 ohms) looking into the R.-F. outputs. Since these resistors are tied to equipotential points on the two transmission lines, they do not disrupt the impedance as seen by the transmission lines.

The above network thus provides a minimum isolation of 6 db from any R.-F. output to any other output due to the 4-way division. Additional isolation is provided between lines 8 and 10 and lines 9 and 11 by the vector cancellation of the currents coupled from one leg of one transmission line to one leg of the other transmisison line through the mutual capacity and mutual inductance.

The four condensers, 108–111, in conjunction with the R.-F. choke 106 are provided to supply the network with A.-F. filtering. These filters isolate the above network from the tone output network 32, which will be now described.

The tone signals, i.e., the A.-F. secondary intelligence signals emitted by the interrogation control unit, are transmitted by the lines 8–11 to the respective R.-F. chokes 112–115, through the respective components of the resistor pad 117, and coupled to the tone output terminals 118 through the transformers 119, which provide two matched balanced outputs. Although FIG. 1 shows only one return line, a practical installation may be of sufficient size and complexity to require more than one low frequency tone line 33 to be supplied to the secondary intelligence receiver 39, or more than one such receiver may be needed to handle all of the signals. Four output terminals 118 are therefore shown to take care of such expanded requirements.

It will be apparent that the embodiments shown are only exemplary and that various modifications can be made in construction and arrangement within the scope of our invention as defined in the appended claims.

I claim:

1. In a coaxial cable system comprising a primary radio-frequency intelligence source, a coaxial cable transmission network including branch coaxial cable lines for delivering signals from said source to a plurality of individual radio-frequency feeder coaxial lines, individual receivers connected to said feeder lines, a radio-frequency interrogating signal source for transmitting interrogation signals along said network to said individual receivers, and means for producing audio-frequency secondary signals from said receivers in their respective branch coaxial lines in response to said interrogating signals; coaxial cable tap-off and attenuator means for connecting individual feeder lines to branch lines with high radio-frequency attenuation and low audio-frequency attenuation, said tap-off means comprising inner and outer tap means respectively for directly engaging the inner and outer conductors respectively of a coaxial cable, insulating means mechanically supporting said inner and outer tap means in spaced and insulated relation to each other, branch line connector means for engaging a branch coaxial line, and attenuator means between said branch line connector means and at least one of said tap means, said attenuator means comprising an inductive winding on a high-frequency magnetic core wound to provide a desired high value of radio-frequency attenuation and a negligibly low value of audio-frequency attenuation.

2. The invention according to claim 1 said inner tap means comprising a linear piercing member for directly engaging the inner conductor of the coaxial cable, and said outer tap means comprising a hollow conductive tubular shell member coaxial with said piercing member and surrounding the rearward portion thereof, the forward portion of said piercing member extending forwardly of said tubular shell member.

3. The invention according to claim 2, said tubular shell member being externally threaded, and said means for engaging the outer conductor of the coaxial cable comprising clamping means for firmly engaging the exterior surface of said coaxial cable, said clamping means having a threaded bore for threadedly receiving said tubular shell member, short piercing pin means carried by said clamping means for engaging an outer conductor of said coaxial cable, said short piercing pin means being conductively connected to said tubular shell means.

4. The invention according to claim 3, said insulating means comprising an insulating portion surrounding said piercing member and supporting it within said tubular shell member, and extending in a forward direction along said piercing member beyond said tubular shell member sufficiently to insulate the pin member from contact with the outer conductor of the coaxial cable.

5. The invention according to claim 4, said piercing pin having an exposed point and being covered with a tightly adherent coat of insulating material tapering toward said exposed point.

6. The invention according to claim 4, said insulating means being recessed rearwardly of said piercing member and within said tubular shell member to accommodate said attenuating means.

7. The invention according to claim 6, said branch line connector means comprising inner and outer coaxial connector means, said attenuator means being connected between said piercing pin and said inner connector means, and said outer coaxial connector means being connected to said tubular shell member.

8. The invention according to claim 7, said attenuator means comprising a toroidal ferrite core having a fine winding threaded thereon, the ends of said winding being respectively connected to said piercing pin and to said inner coaxial connector means.

9. A tap-off for a coaxial cable of the type comprising conductive clamping means for firmly engaging a coaxial cable in electrical contact with the outer conductor thereof, a threaded aperture in said clamping means, a threaded central terminal member supported by said clamping means in said aperture and having an insulated central piercing conductor at one end thereof terminating in a point for engagement with the central conductor of an engaged coaxial cable a central coaxial cable terminal at the other end thereof, and an inductor element connected between said central conductor and said coaxial cable terminal, said inductor element comprising a toroidal high-frequency magnetic core, and a winding of a plurality of turns of fine insulated wire threaded through and around said core.

10. An inductive tap-off attenuator and coupler for coupling a branch coaxial line to an insulated coaxial transmission cable with low audio frequency attenuation and a high predetermined radio frequency attenuation, said transmission cable having a central inner conductor and a coaxial outer conductor spaced and insulated therefrom; said attenuator comprising conductive clamping means having groove means for firmly engaging a coaxial cable and short conductive piercing means for engaging the outer conductor of a cable held in said groove means, said clamping means having a threaded aperture axially intersecting said groove means, and a central terminal member having a threaded force-applying hollow shell member threadedly mounted in said aperture, a central conducting element mounted in said shell member, said element comprising a connector portion for engagement with the central conductor of a branch circuit coaxial cable and a pin portion of sufficient length to engage the central conductor of a coaxial transmission line held in said groove when said shell is threaded into said aperture, said two portions being aligned with their adjacent ends separated, insulating means mechanically retaining said two portions in said hollow shell member, and a high-frequency inductive attenuating member electrically connecting said two portions and mounted in said insulating member, said inductive member comprising a toroidal high-frequency magnetic core and a winding of a plurality of turns of fine insulated wire threaded through and around said core to provide a predetermined radio frequency impedance but a very low audio frequency impedance.

11. The invention according to claim 10, said insulating means comprising a cylindrical insulating member having an aperture in one side thereof for receiving said attenuating member.

References Cited in the file of this patent

UNITED STATES PATENTS

| | | |
|---|---|---|
| 2,694,183 | Edlen et al. | Nov. 9, 1954 |
| 2,811,697 | Hogan | Oct. 29, 1957 |
| 2,843,827 | Blonder | July 15, 1958 |
| 2,854,570 | Broverman | Sept. 30, 1958 |
| 2,951,220 | Miller | Aug. 30, 1960 |